United States Patent [19]

Birkholtz

[11] 3,735,320
[45] May 22, 1973

[54] DEVICE FOR COMPENSATING ELASTIC AFTER-EFFECTS OR CREEPING

[75] Inventor: Gottfried Birkholtz, Weiterstadt, Germany

[73] Assignee: Firma Carl Schenck Maschinenfabrik GmbH, Darmstadt, Germany

[22] Filed: Sept. 13, 1971

[21] Appl. No.: 179,976

[30] Foreign Application Priority Data

Sept. 23, 1970 Germany..................P 20 46 855.7

[52] U.S. Cl..........................................338/2, 338/3
[51] Int. Cl..................................................G01l 1/22
[58] Field of Search...........................338/2, 3, 5, 6; 317/246; 73/88.5 R, 88.5 SD

[56] References Cited

UNITED STATES PATENTS

| 3,451,030 | 6/1969 | Garfinkel | 338/2 |
| 3,137,834 | 6/1964 | Pfann | 73/88.5 R X |
| 2,933,665 | 4/1960 | Dimeff | 317/246 |

Primary Examiner—C. L. Albritton
Attorney—W. G. Fasse

[57] ABSTRACT

The present device prevents the transmission of creeping from a structural element to another structural element such as a measuring device, by means of an intermediate member positioned between the measuring device and the structural element. The material of the intermediate member is selected so that its creeping characteristics compensate the creeping of the structural element. The intermediate member may be further selected to also compensate for creeping due to temperature changes.

5 Claims, 3 Drawing Figures

PATENTED MAY 22 1973 3,735,320

DEVICE FOR COMPENSATING ELASTIC AFTER-EFFECTS OR CREEPING

BACKGROUND OF THE INVENTION

The present invention relates to a device for compensating the effects of creeping. More specifically, the present device prevents the transfer of creeping effects from elastically deformable structural elements to other structural elements such as measuring devices attached to the first mentioned structural elements. Such creeping effects may be the result of forces and/or temperature changes to which said first mentioned structural elements may be subjected. An elastically deformable structural element may be, for example, the measuring spring in a measuring means such as a gauge.

The theory of elasticity defines the term "creeping" as a time responsive deformation of a body after a force has acted on the body. The meaning or connotation of "creeping" may also be expressed as an elastic after effect. Creeping is reversible and it is dependent on the temperature, the load, and the time period during which the load acts on the body. For example, the creeping effect in a measuring gauge such as a tensiometer, a pressure gauge, or the like causes a change of the reading as a function of time. In other words, the reading does not remain the same as a function of time when a given, constant force if effective on an elastically deformable body. Those skilled in the art will appreciate that such an effect constitutes a serious disadvantage because it impairs the accurate ascertaining of forces which are actually effective on a structural element.

OBJECTS OF THE INVENTION

In view of the foregoing it is an object of the present invention to provide a device which will prevent the creeping effect from affecting the measuring of elestic deformations of elastic structural elements.

Another object of the invention is to compensate the creeping effect of a structural element by selecting the creeping characteristics of an intermediate member so that said effect will not be transmitted to another structural element.

Yet another object of the invention is to interpose a creeping effect compensating member between two structural elements whereby the compensating member has a creeping characteristic which is substantially more pronounced than the creeping characteristic of each of said elements.

A still further object of the invention is to provide an intermediate member which absorbs the creeping from an adjacent structural element so that the creeping is not transferred to another adjacent structural element.

SUMMARY OF THE INVENTION

According to the invention there is provided a creeping effect compensating device in which an intermediate compensating member is operatively located between an elastically deformable structural element and another structural element such as the support for a measuring means. The compensating intermediate member has a creeping characteristic of its own which is such that the creeping of the intermediate member prevents the transmission of the creeping of one structural element to the other.

The creeping of the intermediate member which is caused by the creeping of the elastically deformable structural element and by the load exerted on the intermediate member by the other structural element, such as a supporting element for a measuring means, prevents the transfer of the creeping of the structural element to said measuring means.

BRIEF FIGURE DESCRIPTION

In order that the invention may be clearly understood, it will now be described, by way of example, with reference to the accompanying drawings, wherein.

DETAILED DESCRIPTION OF A PREFERRED EMBODIMENT

Figure 1:
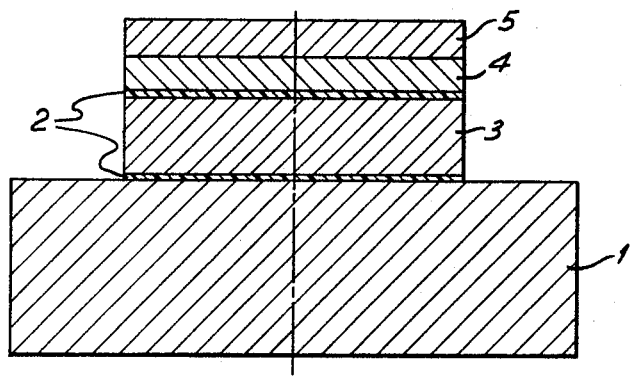
FIG. 1 is a cross-section through one embodiment of a creeping compensating device according to the invention shown in its rest position, that is, wherein no force has as yet been applied to the elastically deformable element.

The present device may best be understood by considering the state of the device at three different times as illustrated by the three figures.

An elastically deformable structural element 1, which is to be subjected to a load or force, may, for example, be the measuring spring of a measuring means such as a tensiometer or pressure gauge. A creeping compensating intermediate member 3 is applied to the structural element 1. Another structural element 4, such as the support for a measuring means 5 for measuring, for example, the elongation of the structural element 1 is applied to the opposite surface of the intermediate member 3. A bonding agent 2 connects the structural element 1 to the intermediate member 3 as well as to the supporting element 4. The bonding agent may be selected from a large group of bonding agents, but may not possess the properties or characteristics of a viscous liquid. High strength bonding agents, for instance tempered, hardenable multi-component resins such as epoxy resins, have been found to be advantageous for the present purpose of bonding the surfaces of the intermediate member to the adjacent structural elements.

Figure 2:
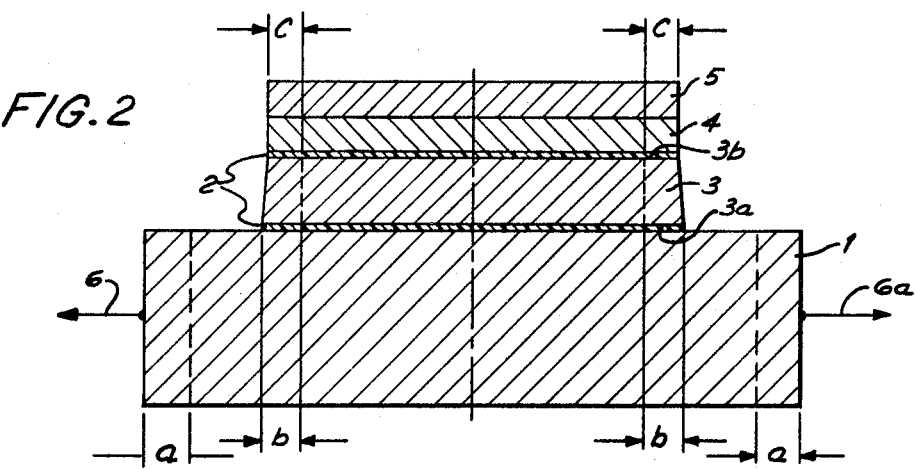
FIG. 2 shows the section of FIG. 1 immediately after a load has been applied to the device.

FIG. 1 shows the device in the rest position, that is prior to the application of any force or load. In FIG. 2 the structural element 1 has been subjected to acting and reacting forces indicated by the arrows 6 and 6a. Under the influence of these forces 6,6a the elastic structural element 1 expands by a length corresponding to (2 × a) whereby it stretches the bottom side or surface 3a of the intermediate member 3 by a length corresponding to (2 × b). This length (2 × b) depends on the elongation "a" of the structural element 1 and on the relative dimensions of the elements 1 and 3. Preferably, the intermediate member 3 should have approximately the same length as the structural element 1 so that the elongation "a" of the element 1 is approximately equal to the elongation "b" of the intermediate member 3. The elongation (2 × b) of the bottom surface 3a of the intermediate member 3 stretches the top surface 3b thereof by a length (2 × c). This elongation or stretching (2 × c) is transmitted to the supporting element 4 of the measuring means or gauge 5. Consequently, the supporting element 4 and the measuring means 5 are elongated by a length corresponding to (2 × c).

The supporting element 4 is made of a very hard material, which either does not creep at all under load, or only to a very minor degree. Therefore, the elongation (2 × c) of the supporting element 4 and of the measuring means 5 is somewhat smaller than the elongation (2 × a) of the structural element 1. However, this does not amount to any disadvantage since the elongation (2 × c) of the measuring means 5 is strictly proportional to the elongation (2 × a) of the structural element 1.

Besides, the just mentioned reduction may be easily compensated by appropriate means, for instance by providing appropriate electrical amplification in connection with a measuring means such as a pressure or strain gauge as is well known in the art. However, such amplification is not necessary in most instances, since the loss is very small. It has been ascertained in experiments that the loss is of the order of about 1 percent.

Figure 3:
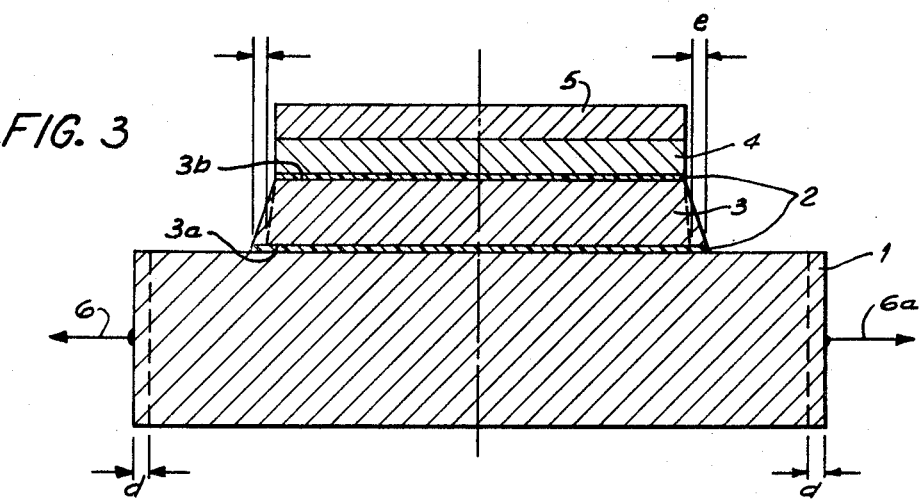
FIG. 3 illustrates the section of FIG. 1 after the load has been effective on the device for a certain period of time.

Over a period of time the elastic structural element 1 is further elongated due to creeping by a length corresponding to (2 × d) as shown in FIG. 3. As a result, the bottom surface or side 3a of the intermediate member 3 is also elongated by a length corresponding to (2 × e). This length (2 × e) depends on the ratio of the lengths of the elements 1 and 3.

The material of which the intermediate element 3 is made as taught herein, is selected so that its creeping characteristics are more pronounced than those of the structural element 1. Therefore, the bottom side 3a of the intermediate member 3 creeps in unison with the structural element 1 whereas the top side 3b of the intermediate member 3 is not deformed at all. This gist of the invention provides the desired compensation. Since the top surface 3b of the intermediate element 3 is connected to the supporting element 4 of the measuring means 5 and since said supporting element 4 does not creep to any measurable extent, the creeping of the element 1 is not transmitted to the measuring means 5. Accordingly, the creeping of the structural element 1 does not cause any deformation of the supporting element 4 nor of the measuring means 5.

In view of the foregoing it will be appreciated that the creeping of the elastic structural element 1 is compensated in such a manner that the elongation of the tensiometer remains constant as a function of time so that it depends solely on the load and is independent of the creeping.

According to the invention it is further possible to compensate the temperature creeping characteristics of the structural element 1 by an appropriate selection of the material for making the intermediate member 3. Stated differently the temperature creeping characteristics of the intermediate member 3 compensate the respective characteristics of the structural element 1. In this embodiment the elogation of the measuring means 5 is also independent of the temperature.

What is claimed is:

1. A strain gauge device comprising a strain gauge, an elastically deformable structural element having a given creeping characteristic, a support for said strain gauge also having a given creeping characteristic, at least one intermediate member arranged between said support and said elastically deformable structural element, means for bonding said intermediate member to said support and to said elastically deformable structural element, said intermediate member having a creeping characteristic which is substantially more pronounced than said given creeping characteristics whereby the effects of creeping of said structural element on said strain gauge are avoided by preventing the transmittal of said creeping effects from said structural element to said strain gauge through said intermediate member.

2. The device according to claim 1, wherein said intermediate member is a material having a creeping temperature characteristic capable of compensating for the creeping-temperature characteristic of said elastically deformable structural element.

3. The device according to claim 1, wherein said bonding means between the support and the intermediate member as well as the bonding means between the intermediate member and the structural element comprise bonding resin.

4. The device according to claim 1, wherein said bonding resin comprises a multi-component bonding resin which is a tempered, high strength, curable resin.

5. The device according to claim 1, wherein said support is made of a hard material having a creeping effect which is small or zero.

* * * * *